Dec. 28, 1965  V. W. WEST  3,225,881
COIN CONTROLLED GASOLINE DISPENSER
Filed Nov. 8, 1962  7 Sheets-Sheet 1
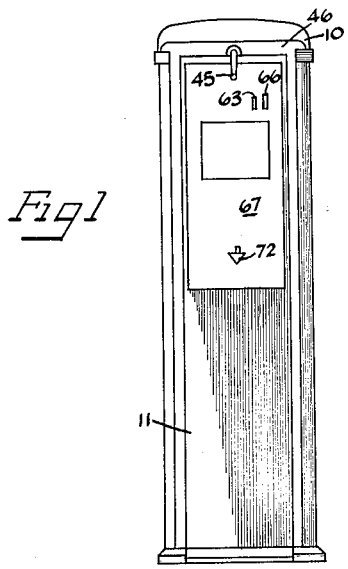
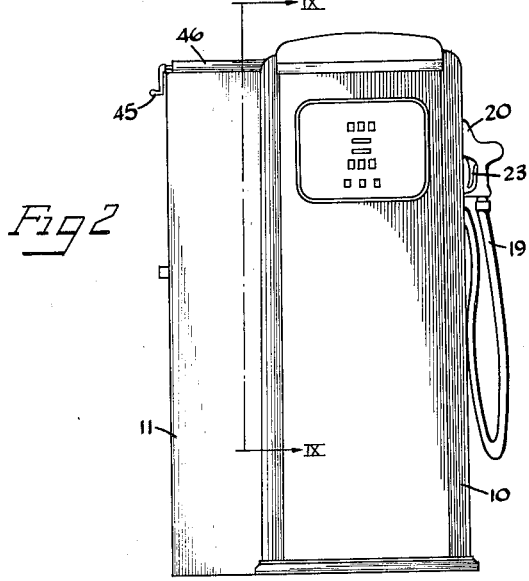
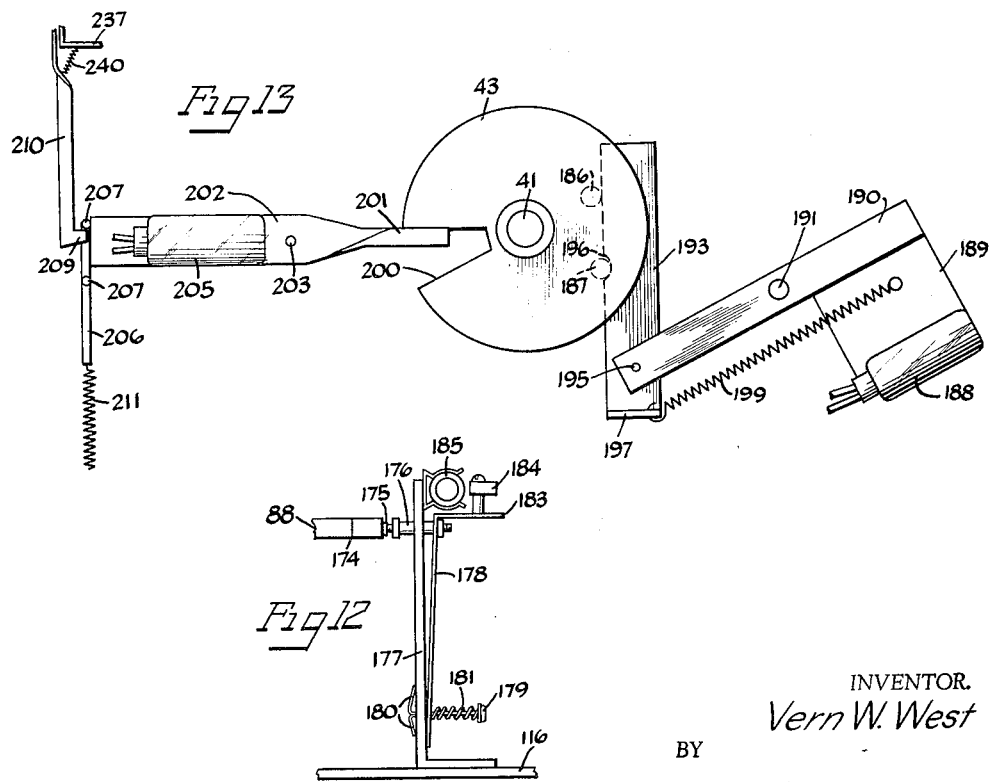
INVENTOR.
Vern W. West
BY
ATTORNEYS

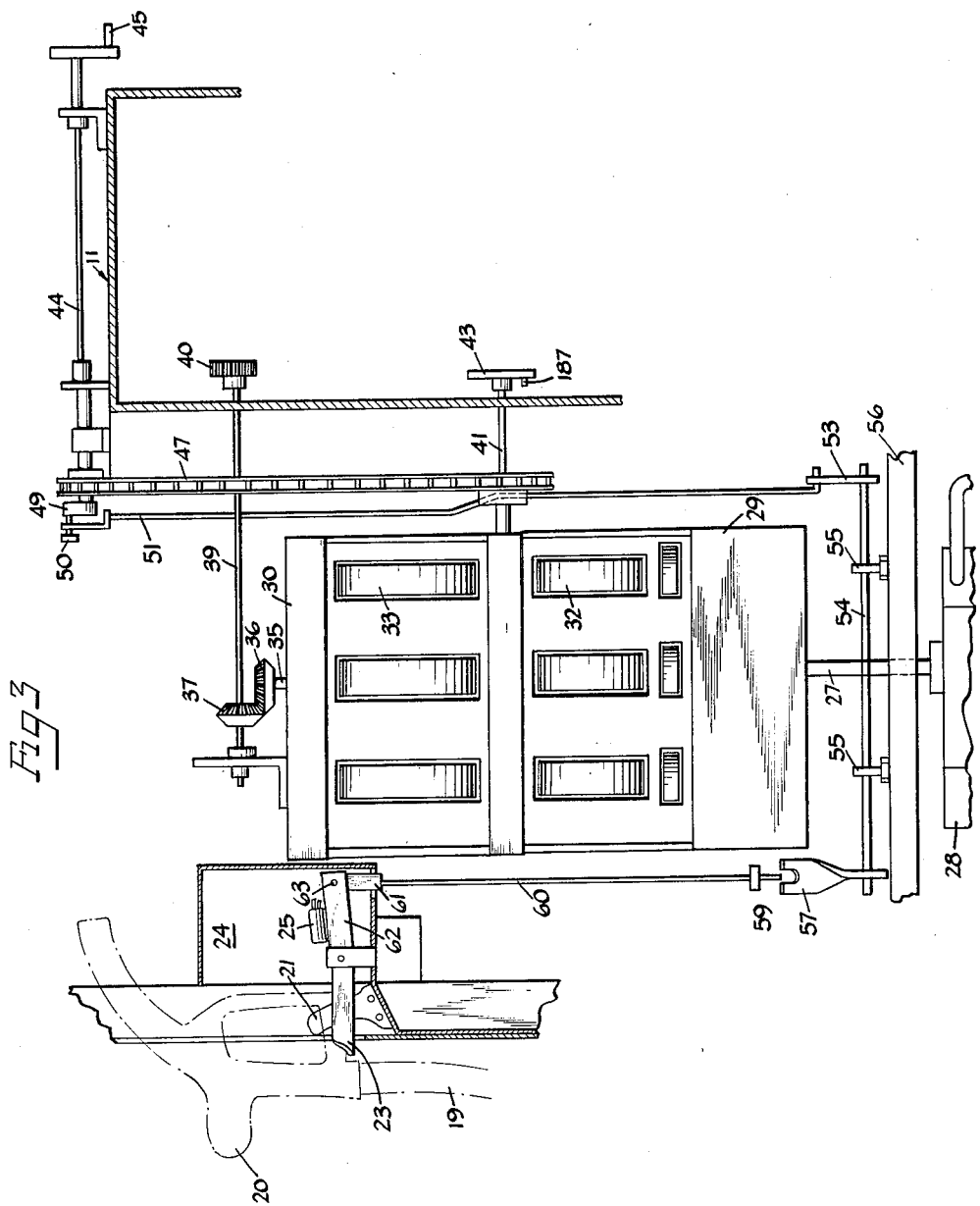

Dec. 28, 1965    V. W. WEST    3,225,881
COIN CONTROLLED GASOLINE DISPENSER
Filed Nov. 8, 1962    7 Sheets-Sheet 3
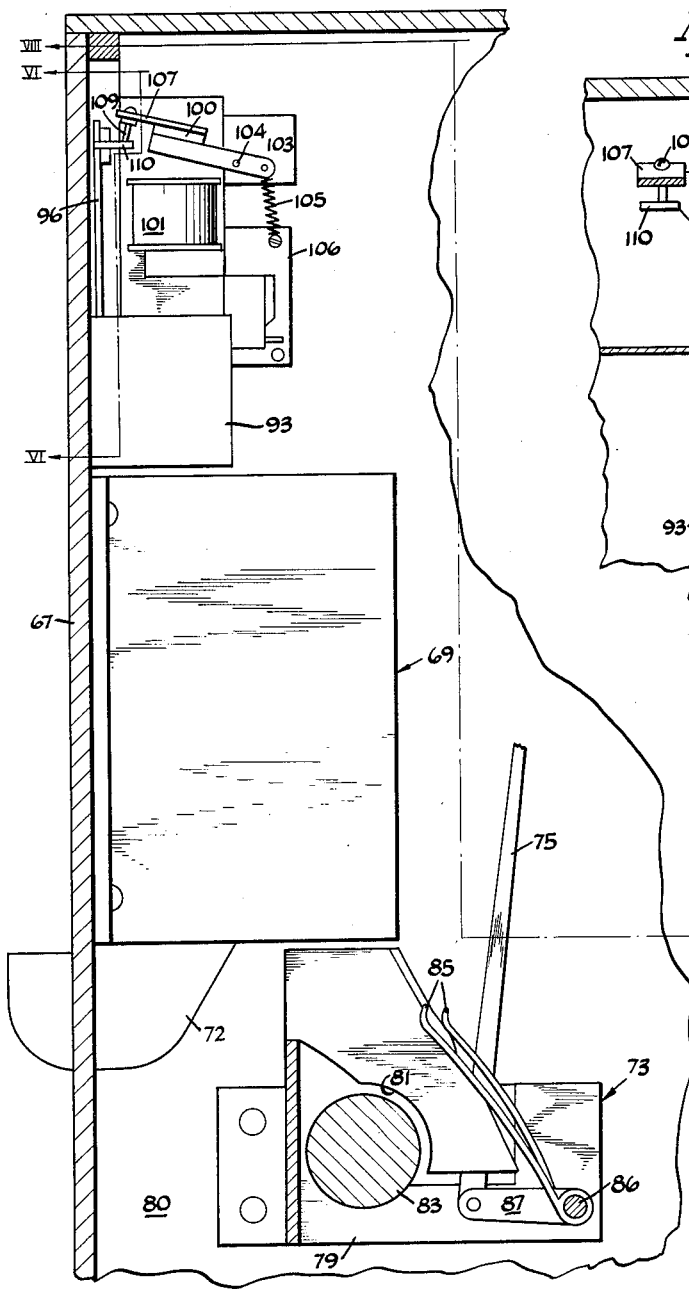
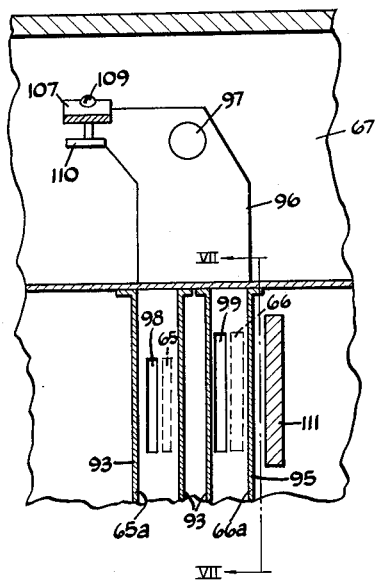
INVENTOR.
Vern W. West
BY
*Hill, Sherman, Meroni, Gross & Simpson*
ATTORNEYS

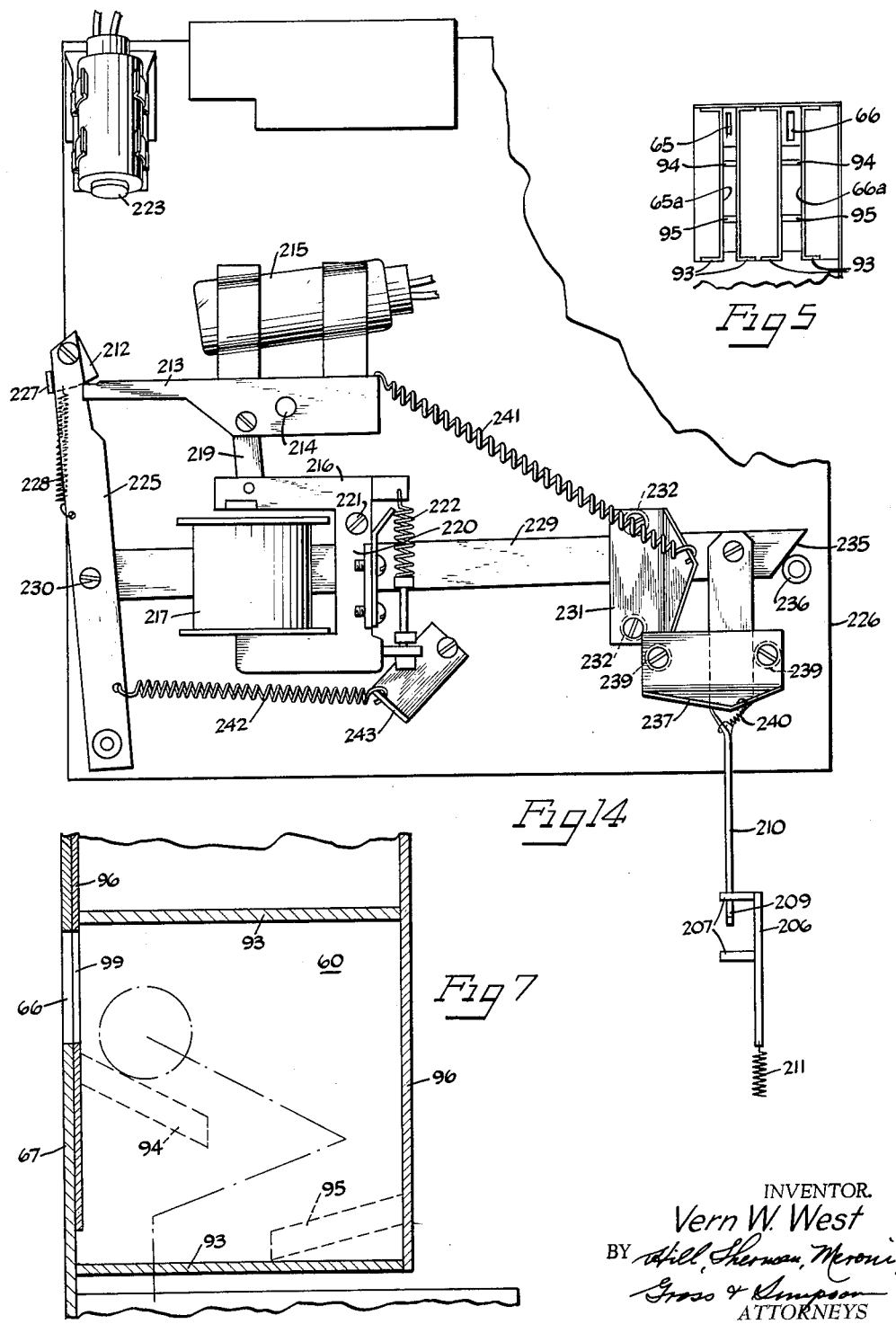

INVENTOR.
Vern W. West

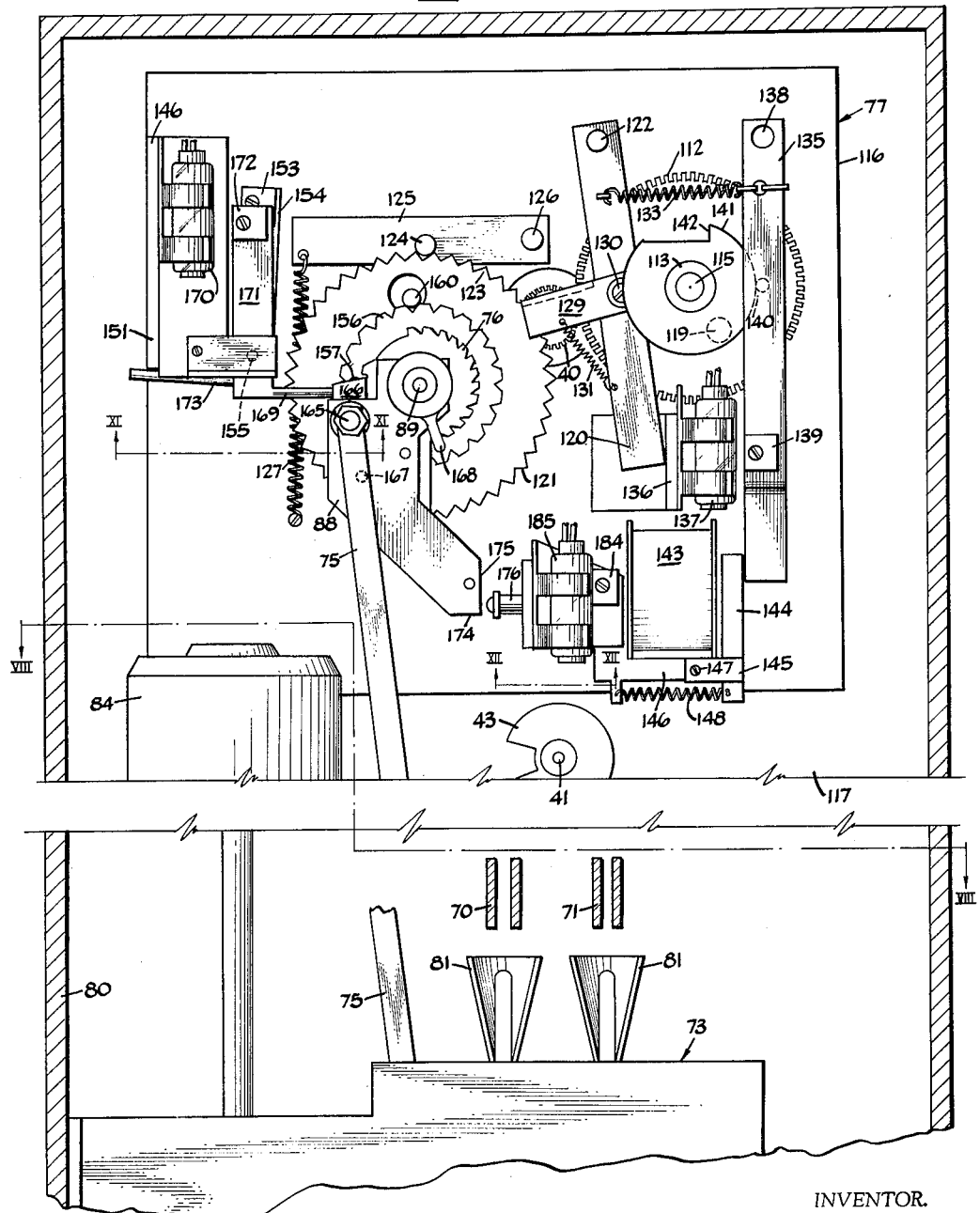

Dec. 28, 1965  V. W. WEST  3,225,881
COIN CONTROLLED GASOLINE DISPENSER
Filed Nov. 8, 1962  7 Sheets-Sheet 7
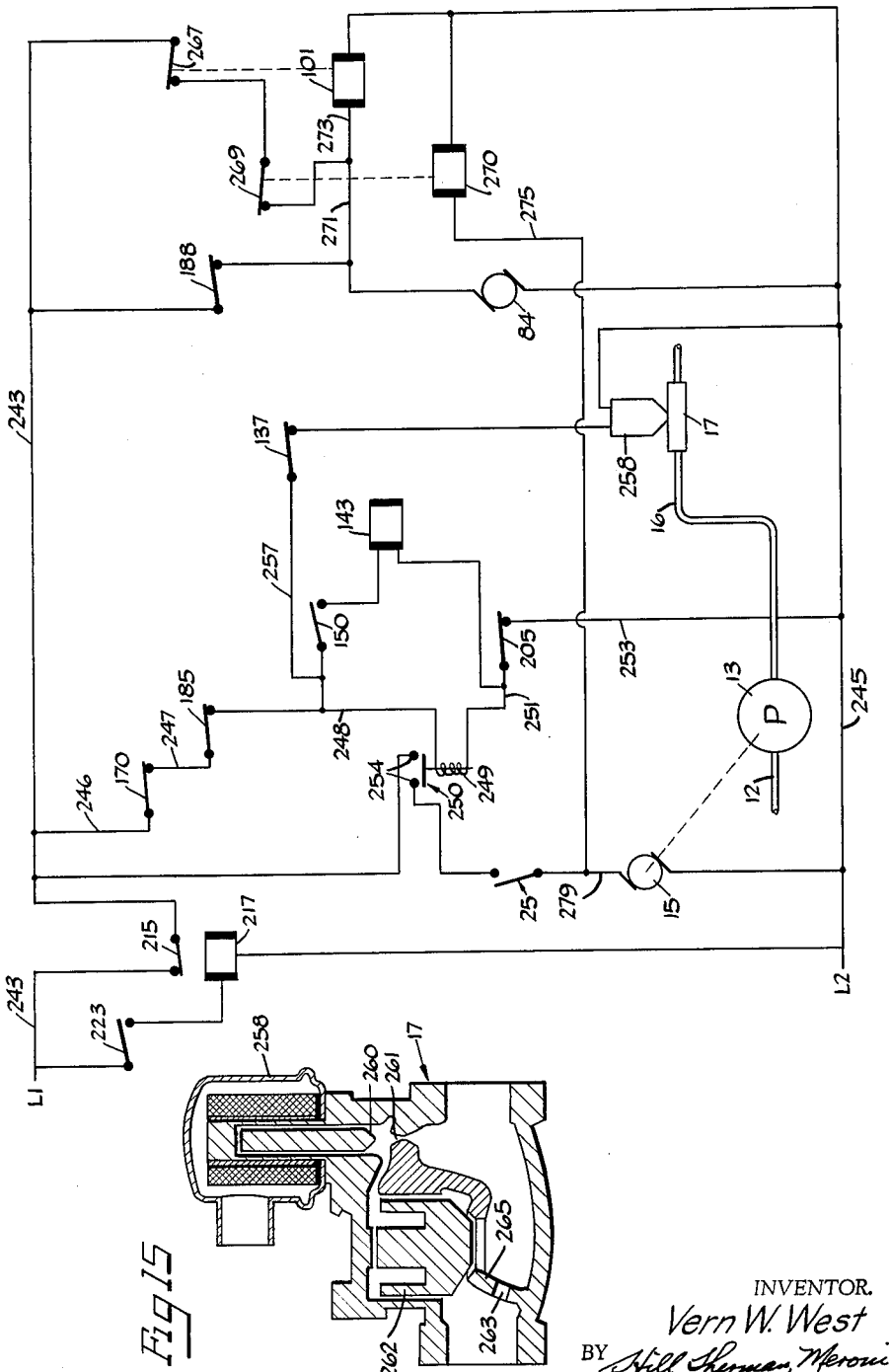
INVENTOR.
Vern W. West
BY
ATTORNEYS United States Patent Office 3,225,881
Patented Dec. 28, 1965

3,225,881
COIN CONTROLLED GASOLINE DISPENSER
Vern W. West, Fort Collins, Colo., assignor to Pat Griffin, Fort Collins, Colo.
Filed Nov. 8, 1962, Ser. No. 236,245
18 Claims. (Cl. 194—3)

This invention relates to improvements in apparatus for dispensing liquids, such as gasoline, fuel oil and the like.

A principal object of the invention is to provide a novel and improved form of apparatus for dispensing liquids, such as gasoline, fuel oil and the like, arranged with a view toward utmost simplicity in construction and efficiency in operation.

Another object of the invention is to provide an improved form of tamperproof coin controlled apparatus for dispensing liquids, such as gasoline, fuel oil and the like.

A further object of the invention is to provide a novel and improved tamperproof coin operated gasoline dispensing apparatus so arranged as to deenergize the electrical system of the apparatus upon the shaking of the apparatus, and to maintain the apparatus deenergized until reset.

A still further object of the invention is to provide a dispensing apparatus in which the quantity of liquid to be dispensed is measured by coins inserted in the apparatus and in which the termination of dispensing is under the control of a meter-computer of the apparatus, in which interlocking connections are provided to prevent the insertion of coins in the coin slots for the apparatus and to prevent the pump motor from operation after a dispensing operation until the meter-computer has been reset.

A still further object of the invention is to provide a liquid dispensing apparatus for gasoline and the like in which the gasoline delivery pump passes the gasoline through a meter-computer, in which the quantity of gasoline to be delivered is measured by coins inserted in coin slots and the delivery of gasoline is terminated by mechanism driven by the meter-computer in accordance with the setting of the apparatus by the value of coins placed in the coin slots, and in which the setting of the apparatus by the coins is a mechanical operation and the controls terminating operation of the apparatus and preventing operation of the apparatus until properly set are electrical.

A still further object of the invention is to provide an improved form of coin slot so arranged as to prevent operation of the apparatus by a wire and the like.

These and other objects of the invention will appear from time to time as the following specification proceeds and with reference to the accompanying drawings wherein:

FIGURE 1 is a view in side elevation of a coin controlled gasoline dispensing apparatus constructed in accordance with the principles of the present invention;

FIGURE 2 is a front elevational view of the apparatus shown in FIGURE 1;

FIGURE 3 is a diagrammatic view diagrammatically showing the meter-computer, the drive connection for resetting the meter-computer and the interlocking connection between the meter-computer and the manually operable switch at the nozzle hook;

FIGURE 4 is a fragmentary vertical sectional view taken through the door for the coin casing and illustrating certain details of the coin operated mechanism for setting the dispenser to deliver a preselected quantity of fluid;

FIGURE 5 is a fragmentary detail view showing the coin slots and coin chutes, with the coin gate removed;

FIGURE 6 is a fragmentary sectional view looking substantially along line VI—VI of FIGURE 4, with certain parts broken away in order to show the coin gate;

FIGURE 7 is a fragmentary sectional view taken substantially along VII—VII of FIGURE 6 and showing certain other details of the coin chutes not shown in FIGURE 6;

FIGURE 9 is a fragmentary vertical sectional view taken substantially along line IX—IX of FIGURE 2, and showing the accumulator controlling the quantity of gasoline dispensed;

FIGURE 12 is a detail fragmentary sectional view taken substantially along line XII—XII of FIGURE 9, and showing certain details of the switch actuator and mounting for deenergizing the pump motor when setting the accumulator by the deposit of coins in the coin slots;

FIGURE 13 is a diagrammatic view illustrating the interlocking connection between the resetting mechanism for the meter-computer and pump and coin gate and coin motor, preventing the dispensing of gasoline except when the meter-computer has been set to zero;

FIGURE 14 is a diagrammatic view illustrating the mechanism for deenergizing the dispensing system upon jarring of the case for the coin operated dispensing mechanism;

FIGURE 15 is a diagrammatic view of the solenoid valve used to control the flow of gasoline to the nozzle; and FIGURE 16 is a wiring diagram of the dispensing apparatus.

Figure 10:
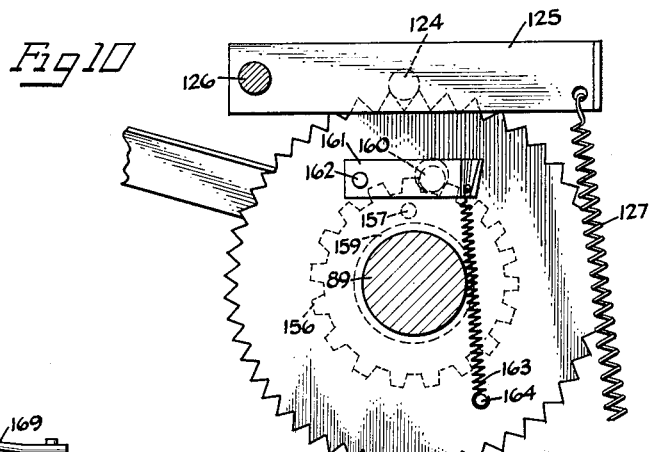
FIGURE 10 is an enlarged detail sectional view showing certain details of the detent drive from a subtracting ratchet wheel of the accumulator to the adding ratchet wheel thereof.
Figure 11:
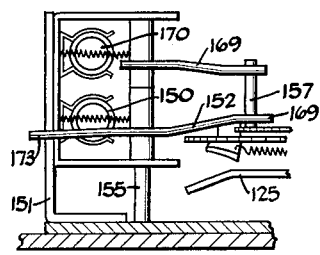
FIGURE 11 is a fragmentary sectional view taken substantially along line XI—XI of FIGURE 9.

In the embodiment of the invention illustrated in the drawings, I have shown a conventional computer pump 10 controlled by a coin actuated control contained within a coin casing 11 attached to one side of said computer pump.

The computer pump 10 is connected with a source of supply of gasoline, which is customarily buried in the ground below the pump. A suction line 12 extends from the source of supply of gasoline and is connected with the intake of a fluid pump 13, driven from an electric motor 15.

A discharge line 16 extends from the pump 15 to a solenoid operated valve 17 within the coin casing 11. The discharge line 16 leads from the valve 17 to and through the usual volumetric meter and flow gate of a meter-computer (not shown) to a hose 19 extending outside of the pump housing and connected at its end with a nozzle 20, detachably carried on a nozzle hook 21 on the outside of the housing for the computer pump 10.

A manually operable switch arm 23 is mounted within a recess 24 for the nozzle hook and nozzle and operates a switch 25 controlling the energization of the pump motor 15, and preventing the energization of said pump motor until the nozzle has been removed from the nozzle hook 21 and the switch 25 has been closed by upward pulling movement on the switch arm 23.

A shaft 27 is driven from a meter 28 and extends upwardly from said meter to a computer head 29. Movement of gasoline through the meter 28 rotates the drive shaft 27 in proportion to the quantity of gasoline moving through the meter. This drive shaft rotates a gear train (not shown) within the computer head and within an upstanding dial case 30, which extends upwardly from the computer head 29. Two banks of dials are mounted on each side of the dial case 30, one above the other. A lower bank of dials 32 is geared to register the volume of gasoline delivered while an upper bank of dials 33 is geared to register the monetary value of the gasoline delivered. These dials operate in unison and are interconnected by gears within the dial case to provide the proper value indication for any given amount of gasoline delivered. A shaft 35 is driven from driving mechanisms (not shown) within the indicator dial case 30 and has a bevel pinion 36 on its upper end meshing with a bevel pinion 37 on a shaft 39 journalled for rotation above a horizontal axis and extending within the coin casing 11. A pinion 40 is keyed or otherwise secured to the shaft 39, to drive a mechanism to subtract values of the gasoline delivered and to shut off the pump when the value of gasoline delivered equals the value of coins deposited, in a manner which will hereinafter more clearly appear as this specification proceeds.

A reset shaft 41 is suitably journalled within the dial case and has driving connection with reset mechanism for the dials 32 and 33 (not shown) for resetting said dials upon turning movement of said shaft. The reset shaft 41 extends within the coin casing 11 and has an interlocking cam wheel 43 on the end thereof, within the coin casing, for preventing operation of the pump motor 15 and pump 13 until the dials 32 and 33 are set to zero, by operation of said reset shaft. The resetting mechanism for the dials 32 and 33 is of a conventional form so need not herein be shown or described further.

The reset shaft 41 is driven from a shaft 44 suitably journalled on the top wall of the casing 11 and having a hand operated reset crank 45 on the outer end thereof. The shaft 44 is covered by a cover 46 extending over the top of the coin casing. A chain and sprocket drive 47 is provided to drive the reset shaft 41 from the shaft 44 upon turning movement of the crank 45.

An interlock is provided between the shaft 44 and the switch arm 23 to prevent operation of said switch arm and closing of the switch 25 until the dials 32 and 33 have been set to zero. This interlock comprises an eccentric disk 49 on the inner end of the shaft 44. A crank pin 50 extends outwardly from said eccentric disk and has a link 51 pivotally mounted thereon. The link 51 extends downwardly along the dial case beneath the computer housing 29 and is connected at its lower end with a lever arm 53 on a rock shaft 54 pivotally mounted on bearing supports 55, 55 mounted on a divider shelf 56 within the pump housing. The shaft 54 extends beneath the computer housing 29 and has an interlocking lever 57 mounted on its end opposite the lever 53 and extending upwardly of the rock shaft 54. The interlocking lever 57 has a forked end portion 59 engageable with the lower end of a plunger 60 suitably guided within the housing for the computer pump. The plunger 60 has a connector 61 on its upper end pivotally connected with an arm 62 of the lever 23 as by a pivot pin 63.

The interlocking lever 57 is moved into position to engage the lower end of the plunger 60 during the operation of resetting the dials and thereby prevents lifting of the lever 23 to close the switch 25 until the dials have been reset. The motor switch 25 may be a normally open mercury switch and closes only when the switch lever 23 is moved upwardly to depress the arm 62 of said switch lever.

The casing 11 containing the coin operated mechanism determining the quantity of gasoline to be delivered through the nozzle 20 upon the deposit of a selected number of coins into said casing through one or both of two coin slots 65 and 66 in a door 67 for the casing is preferably formed as a box-like unit having comparatively heavy walls with a solid lock for the door 67 to render it difficult for the door to be opened or the case or door to be broken into by pilferers.

The coin control within the casing 11 includes a coin receiving impulse apparatus and an accumulator which operates responsive to impulses of both the coin receiving apparatus and movement of the computer pump as will hereinafter more clearly appear as this specification proceeds.

As shown in FIGURE 4, a coin receiving apparatus indicated generally by reference character 69 is mounted on the door 67 and extends inwardly therefrom. The coin slots 65 and 66 may receive two different types of coins, such as, a fifty cent piece insertable in the slot 65 and a dollar insertable in the slot 66. Two guide chutes 65a and 66a register with the slots 65 and 66 and guide the deposited coins into selectors 70 and 71 respectively, fixed to the inner wall of the door. The selectors 70 and 71 are of a conventional construction and are adapted to permit true coins to move to the outer corners of the selectors and counterfeit or defective coins to move to the inward corners of the selectors. A coin return trough 72 is mounted on the door 67 below the selectors 70 and 71 to receive and return the defective coins.

The coins drop from the selectors into an impulser 73 which is adapted to project a thrust bar 75 at selective increments of distance proportioned to the value of a coin deposited, for actuation of an adding ratchet wheel 76 of an accumulator 77 as will hereinafter be more fully described as this specification proceeds.

Figure 8:
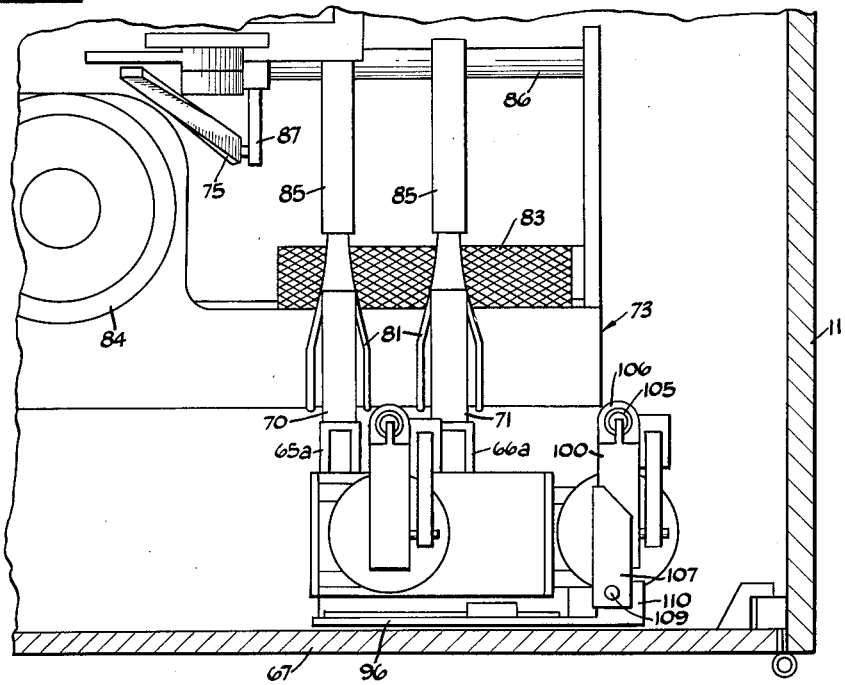
FIGURE 8 is a fragmentary horizontal sectional view taken substantially along line VIII—VIII of FIGURE 4 and illustrating certain details of the coin operated mechanism for setting the accumulator.

The impulser 73 is mounted on a support frame structure 79 mounted on a side wall 80 of the casing 11 and extending inwardly of said side wall within the casing. A plurality of troughs 81 extend upwardly from the frame structure 79, each trough 81 being in alignment with a selector 70 or 71 (FIGURES 4, 8 and 9) and being adapted to receive coins dropped from said selectors. The troughs 81 are arcuate in form and arch over a knurled roller 83 driven by a coin motor 84 in a suitable manner. The troughs 81 guide and retain the coins to be engaged by said coin roller 83 and moved by said coin roller past fingers 85 extending within open portions of said selectors, as in my Patent No. 2,995,229 dated August 8, 1961.

Each finger 85 is mounted on a horizontal shaft 86 and is lifted by a coin passed therebeneath, by the knurled roller 83, a distance proportional to the value of the particular coin passing through the associated trough. The horizontal shaft 86 is suitably journalled within the frame structure 79 to be rocked by either of the fingers 85. A lever 87 suitably secured to the shaft 86 and extending inwardly therefrom along the frame structure 79 has the thrust bar 75 pivoted to its end. The thrust bar 75 is connected at its upper end to a rockable member 88 pivoted on a shaft 89 coaxial with the adding ratchet wheel 76 which is also mounted on the shaft 89 for rotation with respect thereto. The rockable member 88 has a pawl 166 pivotally mounted thereon on a pivot pin 167 and engageable with a tooth of the ratchet wheel 76 to move said ratchet wheel a distance determined by the value of the coin passed under a finger 85.

Each chute 65a and 66a is of a similar construction and is arranged to reverse the travel of the coin as it passes therealong and to block a wire that may be inserted through a coin slot in an attempt to trip a finger 85 of the dispensing mechanism, to effect the discharge of gasoline without putting a coin in the slot or to effect the discharge of a greater amount of gasoline than indicated by the particular coin placed within a coin slot.

As shown in FIGURES 5, 6 and 7, each coin chute is formed from a pair of channel-like members 93 having the flanges thereof extending outwardly and spaced apart by oppositely inclined bars 94 and 95. The spaces between the webs of the channel-like members are larger than the width of a coin, to retain the coin in an upright position as it passes along the associated coin chute. The spacer bar 94 is inclined downwardly from the associated coin slot toward the bottom of the coin chute, and is shown in FIGURE 7 as stopping short of the center of the coin chute. The spacer bar 95 is spaced beneath the spacer bar 94 and is inclined downwardly from the inner end of the coin chute toward the center of the coin chute and stops short of the center of the coin chute. A coin deposited through the associated coin slot will then roll along the spacer bar 94 and drop onto the spacer bar 95 and reverse its path of travel and then drop downwardly to an associated coin selector to either pass along the knurled roller 83 underneath a finger 85, or to be returned through the coin return trough 72.

If a wire should be passed through either coin slot 65 or 66, it will strike an inner end wall 96 of the respective coin slot or will strike a spacer bar 95. The wall 96 and spacer bar 95 will offer sufficient obstruction to the wire, to prevent lifting of either of the fingers 85 to set the dispensing mechanism for operation.

A coin gate 96 is pivotally mounted on the inside of the door 67 on a pivot pin 97 disposed above the coin chutes 65a and 65d. The coin gate 96 is in the general form of a plate and normally covers the coin slots 65 and 66. The coin gate 96 has slots 98 and 99 therein corresponding to the respective slots 65 and 66 and registrable with said slots as the coin gate is shifted to an open position, to accommodate coins to be inserted through the slots 65 or 66 into the respective coin chutes 65a or 66a.

The coin gate 96 is shifted into an open position by the actuation of an armature 100 of a solenoid 101 (FIGURE 4). The armature 100 is in the form of a lever arm pivoted to a bracket 103 on a pivot pin 104. A tension spring 105 connected between a stationary bracket 106 and the inner end of the armature 100 is provided to bias the armature away from the solenoid coil into the position shown in FIGURE 4. The armature 100 has an arm 107 extending over the solenoid and having an adjustment screw 109 on the end thereof engageable with a ledge 110 projecting inwardly from the upper end portion, which in FIGURE 6 is shown as being a counter- 101 will thus depress the armature 100 about the axis of the pivot pin 104 and pivot the coin gate 96 in a direction, while in FIGURE 6 is shown as being a counterclockwise direction, to bring the coin gate 96 into engagement with a stop 111. In this position of the coin gate, the respective coin slots 65 and 66 will register with the slots 98 and 99 and coins may be deposited through either one of said slots into the associated coin chutes 65a or 66a. As the coin gate solenoid 101 is deenergized, after the adding ratchet wheel 76 of the accumulator 77 has been set, the coin gate 96 will drop back into the closed position shown in FIGURE 6 to prevent the deposit of further coins through the coin slots 65 or 66, until the termination of the dispensing operation and the resetting of the computer dials to zero.

Referring now in particular to the accumulator 77 adding the values of coins deposited and subtracting the values of gasoline delivered and shutting off the dispensing operation when the value of gasoline delivered equals the value of coins deposited, the pinion 40 on the computer meter drive shaft 39 forms a subtracting drive member and meshes with and drives a gear 112 on a hollow shaft 113 rotatably mounted on a stationary shaft 115 mounted on a support plate 116 for the accumulator, which in turn is mounted on a back wall 117 of the coin casing 11.

The spur gear 112 has a pin 119 extending outwardly from the face thereof and forming a stepping cam engageable with a lever arm 120 pivotally mounted on the plate 116 on a pivot pin 122. The pin 119 engages and actuates the lever arm 120 once during each revolution of the gear 112 and indicates a selected value of gasoline delivered for each cycle of rotation thereof.

A subtracting ratchet wheel 121 is rotatably mounted on the shaft 89 and has a periphery serrated by uniformly spaced teeth 123. The subtracting ratchet 121 is restrained from free rotation by a detent roller 124 mounted intermediate the ends of a lever arm 125. The lever arm 125 is pivotably mounted on the plate 116 on a pivot pin 126. A tension spring 127 secured to the plate 116 at one end, is connected with the free end of the lever arm 125 to bias the detent roller 124 into engagement with the teeth 123 of the ratchet wheel 121, and restrain said ratchet wheel from free rotation and to index stepping movement of said ratchet wheel.

The subtracting ratchet wheel 121 is moved step by step by a pawl 129 pivotally mounted on the lever arm 120 intermediate the ends of said lever arm, on a pivot pin 130. A tension spring 131 biases the pawl 129 into engagement with successive ratchet teeth 123. A tension spring 133 is connected between the lever arm 120 and a lever arm 135 and biases the free end of the lever arm 120 into engagement with the vertical leg of a bracket 136 for switch 137, herein shown as being a mercury switch of a type which is normally closed and which opens the circuit as a magnet 139 mounted on the lever arm 135 is engaged with the casing of said switch. The lever arm 135 is mounted on the plate 116 on a pivot pin 138. The tension spring 133 biases a follower pin 140 into engagement with the face of a cam 141 mounted on the sleeve or hollow shaft 113 for rotation with the gear 112. The cam 141 has a notch 142 formed in the face thereof, accommodating the pin 140 to drop therein once during each revolution of the cam 141 and thereby accommodating the magnet 139 to move into engagement with the casing for the switch 137 and open said switch.

It will here be noted that the notch 142 is spaced circumferentially from the pin 119 in such a manner that the pin 119 will effect the advance of the ratchet 121 and the notch 142 will then come into position to register with the pin 140 and accommodate opening of the switch 137 at the termination of a dispensing operation. This lag in the dropping of the pin 140 into the notch 142 is to accommodate the subtracting cam to move a distance sufficient to first condition the system for termination and effect the energization of an electromagnet 143, controlling movement of the lever arm 135 and thereby allowing the magnet 139 to move into position to shut off the flow control valve 17. The electromagnet 143 when energized attracts an armature 144 engaged by the free end of the lever 135 and holding the pin 140 from dropping into the notch 142 until the armature 143 is energized at the termination of a dispensing operation. This is to prevent the shutting off the valve 17 during each step of movement of the subtracting ratchet wheel 121 and until a quantity of gasoline has been dispensed as determined by the value of coins inserted in the coin slots 65 and 66.

The armature 144 is shown as having a leg 145 extending at right angles with respect to said armature, intermediate the ends thereof, and pivotally mounted on a bracket 146 extending along the electromagnet 143, on a pivot pin 147. A tension spring 148 is connected between the bracket 146 and free end of the armature 144 and biases the armature 144 into engagement with the end of the lever 135 to hold the magnet 139 out of engagement with the casing for the switch 137 except when the electromagnet 143 is energized.

The electromagnet 143 is energized upon the closing of a circuit through a mercury switch 150 mounted on a bracket 151, shown in FIGURE 9 as being mounted on the left hand side of the plate 116 and as extending outwardly therefrom.

The mercury switch 150 is a normally open switch and is closed to complete an energizing circuit to the electromagnet 143 as a magnet 153 engaging the casing of the switch 150 is moved away from said casing. The magnet 153 is mounted on a lever arm 154 pivotally mounted on a pivot shaft 155 extending parallel to the shaft 89 and spaced outwardly therefrom. The lever arm 154 is pivoted intermediate its ends and has an arm 152 extending from the end thereof opposite the magnet 153 toward the shaft 89 and over a toothed wheel 156, to be engaged by a stop pin 157 on said wheel at the termination of a dispensing operation. This will effect the closing of a circuit through the switch 150 and energization of the electromagnet 143. The armature 144 will thereby be drawn toward said electromagnet and accommodate the pin 140 to drop into the slot 142 and effect closing of the water valve 17.

The toothed wheel 156 is mounted on the lower end of a sleeve 159 mounted on the shaft 89 for rotation with respect thereto. The sleeve 159 also forms a mounting for the adding ratchet wheel 76.

A drive connection is provided between the subtracting ratchet wheel 121 and the toothed wheel 156, which is shown in FIGURE 10 as being in the form of a detent pin 160 mounted on a lever 161 intermediate the ends of said lever, and engaging the teeth of said toothed wheel, to effect movement of said toothed wheel with the subtracting ratchet wheel 121 and to accommodate movement of said toothed wheel with respect to said subtracting ratchet wheel when setting the adding ratchet wheel 76 by the deposit of coins in the coin slots 65 or 66. The lever 161 is mounted on the undersurface of the ratchet wheel 121 on a pivot pin 162 and is biased to engage the detent pin 160 with the teeth of said toothed wheel, by a tension spring 163. The tension spring 163 extends along the inner side of the ratchet wheel 121 and is connected to said ratchet wheel at one end, on a pin 164, and is connected at its opposite end to the free end of the lever 161.

The thrust bar 75 is pivotally connected with the rockable member 88 on a pivot pin 165. The rockable member 88 has a pawl 166 pivotally mounted thereon on a pivot pin 167. A tension spring (not shown) is connected between the pawl 166 and the rockable member 88 to bias said pawl into engagement with the teeth of the adding ratchet wheel 76. A stop 168 is provided to release the pawl 166 upon counterclockwise movement of the rockable member 88.

The teeth of the adding ratchet wheel 76 have the same spacing as the teeth of the toothed wheel 156 and the teeth of the subtracting ratchet wheel 121. Thus, each time the thrust bar 75 is lifted, the adding ratchet wheel 76 will be rotated about the shaft 89 a distance corresponding to the value of the coin inserted in a coin slot. Thus, if the spacing between the teeth of the adding ratchet wheel 76 is equivalent to fifty cents worth of gasoline, when a fifty cent piece is deposited in its coin slot, the adding ratchet wheel 76 will be advanced a distance of one tooth. When a dollar is deposited in the coin slot, the adding ratchet wheel 76 will be advanced a distance equal to two teeth. This will move the stop 157 and the toothed wheel 156 a corresponding distance, each step being indexed by the indexing pin 160. At the same time, the stop pin 157 is moved away from the arm 152 of the lever 154 the same distance the adding ratchet wheel is moved by the pawl 166. When the adding ratchet 76 and stop 157 have been set to determine the delivery of a selected quantity of gasoline, in accordance with the coins deposited in the coin slot or slots, the switch 25 at the nozzle is closed by lifting movement of the switch arm 23, and the valve at the nozzle is opened, the gear 112 will be driven by the meter-computer to engage the cam pin 119 with the lever arm 120 once during each cycle of rotation of the gear 112. This will advance the subtracting ratchet wheel 121 a distance equal to one tooth during each cycle of rotation of the cam pin 119 and will move the stop pin 157 backwardly toward an initial neutral position.

During this movement of the subtracting ratchet wheel 121, the pin 157 will first engage the lever arm 152 and effect the closing of a circuit through the electromagnet 143. The pin 140 then dropping into the notch will accommodate the magnet 139 to engage the casing of the mercury switch 137 and effect the opening of a circuit to the valve 17. The valve 17 will then close. The pin 157 will then engage a lever arm 169 extending over the toothed wheel 156 at a retreating angle with respect to the lever arm 152. This will move the magnet 172 away from the mercury switch 170 and effect opening of the switch 170.

The lever arm 152 has a stop arm 173 extending beyond the end of the bracket 151 and engaged with the end of said bracket to stop movement of the toothed wheel 156 and adding ratchet 76 in a return direction, and to thereby assure the adding ratchet 76 and stop 157 will be in the proper position to initiate a next succeeding dispensing operation, after the completion of one dispensing operation.

The rockable member 88 has a depending leg 174 having an engaging end portion 175 engageable with a plunger 176 slidably guided in a bracket 177 mounted on and extending outwardly of the base 116, as shown in FIGURE 12. The plunger 176 is connected with the upper end portion of a resilient arm 178 extending upwardly along the bracket 177, and connected thereto adjacent its lower end, by a rivet 179 extending through the arm 178 and bracket 177. The rivet 179 has end portions 180 turned at generally right angles with respect thereto, to abut the opposite side of the bracket 177 from the arm 178. A compression spring 181 is interposed between the head of the rivet 179 and the arm 178 and coupled with the resiliency of said arm serves to bias said arm toward the bracket 177.

The arm 178 has a right angled outer end portion 183 having a magnet 184 mounted thereon in position to register with and engage the casing of a mercury switch 185 mounted on the upper end of the bracket 177. The mercury switch 185 is designated as a normally closed switch and opens when the magnet 184 engages the casing of the switch, and closes as the magnet 184 is moved away from the casing of the switch. Thus, during each stepping operation of the pawl 166 to advance the adding ratchet a distance of one tooth, the engaging end 175 of the leg 174 will move away from the plunger 176 and accommodate the magnet 184 to engage the casing of the switch 185 and open a circuit through said switch. The switch 185 is connected in the energizing circuit to the pump motor 15 and serves to deenergize the pump motor each time the adding ratchet wheel is being set.

At the termination of an adding operation, the weight of the thrust bar 75 will pivot the pawl 166 away from an associated ratchet tooth and engage the engaging end portion 175 of the leg 174 with the plunger 176, to effect movement of the magnet 184 away from the switch 185 and thereby effect the closing of a circuit through said switch.

The apparatus is, therefore, operative to deliver gasoline when the toothed wheel 156 and stop 157 have been set and is inoperative to deliver gasoline whenever an impulse is being imparted to the adding ratchet wheel 76 by the dropping of a coin in a coin slot.

An interlocking connection is provided between the reset shaft 41, the coin motor 84 and coin gate 96, and the pump motor 15 and valve 17. As shown in FIGURE 13, the cam wheel 43 on the end of the shaft 41 has camming pins 186 and 187 extending from the inner face thereof toward the wall of the casing 11. The pin 187 is provided to momentarily operate a kick switch 188 on the lower end of a bracket 189. The pin 186 is provided to retain the switch in its inactivated position. The switch 188 is a mercury switch and the bracket 189 is mounted on an arm 190 and depends therefrom. The arm 190 is pivoted intermediate its ends to the wall of the coin case 11 on a pivot pin 191. A second arm 193 is pivotally mounted on the opposite end of the arm 190 from the bracket 189, on a pivot pin 195. The arm 193 has a notch 196 formed therein, adapted to engage the pin 187 activating the mercury switch 188. The arm 193 also has a right angled lower end portion 197 underlying the arm 190 and biased into engagement with the arm 190 by a tension spring 199. The tension spring 199 is connected between the bracket 189 and the lower end portion of the arm 193. The reset shaft 41 turns in a counterclockwise direction for one complete turn when resetting the dials of the meter-computer to zero. As the cam wheel 43 is turned in a counterclockwise direction, the pin 187 will engage the notch 196 and pivot the arm 193 in a clockwise direction and raise said arm about the axis of the pivot pin 191. After 360° counterclockwise movement of the cam wheel 43 the cam wheel will turn back in a clockwise direction. During this movement of the cam wheel the pin will move the arm 193 downwardly and pivot the arm 190 in a counterclockwise direction to position the switch 188 in position to momentarily activate the switch, as shown in FIGURE 13. As the cam disk 43 continues to rotate in a clockwise direction the pin 187 will come out of the notch 196 and the arm 193 will rest on the pin 186, when the cam disk is at rest. This will tilt the mercury switch into its inactivated position.

Activation of the switch 188 will momentarily complete a circuit to the coin motor 84 and the coil of the solenoid 101, to start the coin motor 84 to drive the coin roller 83, and move the coin gate 96 to register the slots 98 and 99 with the slots 65 and 66. A holding circuit is provided to hold the coin gate open and the coin motor energized until the switch 25 is closed, as will hereinafter more clearly appear as this specification proceeds.

The cam wheel 43 also has a notch 200 therein into which extends an arm 201 of a lever 202. The lever 202 is pivotally mounted intermediate its ends on a wall of the casing 11, on a pivot pin 203. The arm 202 carries a tilt switch 205, herein shown as being a conventional form of mercury switch. The tilt switch 205 is connected in the energizing circuit to the pump motor 15 and the valve 17, and is positioned in an activated position under control of the notch 200 and cam wheel 43, when the meter-computer dials are set to zero. The tilt switch 205 and arm 202 thus serve as an interlock to prevent operation of the pump 13 until the meter-computer dials are set to zero.

The arm 202 carries at its outer end a fork 206 having spaced tines 207 extending at right angles to the surface of said arm 202. The tines 207 extend along opposite sides of a hooked end portion 209 of a release member 210. A tension spring 211 biases the upper tine 207 into engagement with the hooked end portion 209 of the release member 210 and also tilts the switch 205 in the activated position under control of the notch 200. The release member 210 is provided to release a latch 212 latching a tilting support 213 for a tilt switch 215 in an open position, and releasing the tilting support to accommodate the closing of said switch when the dials are reset.

The tilting support 213 is pivotally mounted on a plate 226 on a pivot pin 214. The plate 226 is mounted on a side wall of the coin case 11, extending at right angles to the wall upon which the accumulator 77 is mounted. The tilt switch 215 controls the flow of main line current to the accumulator switches and to the pump motor, coin motor and solenoid for actuating the coin gate. The tiltable support 213 is pivotally connected with a rockable armature 216 of a solenoid 217 through a link 219. The armature 216 is mounted at its end opposite the link 219 to a support 220 extending along one side of the solenoid coil, on a pivot pin 221. A spring 222 biases the armature 216 away from the coil of the solenoid 217 to accomodate the tilt switch 215 to remain in a normally closed position. A switch 223 is connected in parallel with the contacts of the switch 215 and is connected with the coil for the solenoid 217 to energize said coil and pivot the armature 216 to move the tilt switch 215 into its open position. The switch 223 is rigidly mounted on the plate 226 in proximity to the switch 215 and solenoid 217. The switch 223 may be a normal open mercury switch and closes a circuit to energize the coil for the solenoid 217 upon a jar of the coin box or the meter computer pump. As the switch 223 is closed by a jar, the coil for the solenoid 217 will be energized. This will tilt the tiltable support 213 and bring said tiltable support under the latch 212 and thereby open the main line circuit through the tilt switch 215, and deenergize the dispenser until the switch 215 is closed by resetting the meter-computer.

The latch 212 is released by a lever 225 and is pivotally mounted on the upper end of said lever 225. The lever 225 in turn is pivotally mounted at its lower end on the plate 226.

The latch 212 has a stop ear 227 engaging the opposite side of the lever from the tiltable support 213. A tension spring 228 is connected between the lever 225 and latch 212 to bias the ear 227 into engagement with the lever 225.

The lever 225 has a link 229 pivotally connected thereto on a pivot pin 230. The link 229 extends under a guide retainer 231 and is guided between vertically spaced spacer collars 232 spacing said retainer from the plate 226. The free end of the link 229 has an inclined camming surface 235 engaging a roller 236 mounted on the plate 226. The link 229 is moved downwardly to move the camming surface 235 thereof along the roller 236, and to thereby move the lever 225 outwardly with respect to the tiltable support 213, to release said tiltable support by the hooked release member 210. The hooked release member 210 extends beneath a retainer 237, between spacer collars 239, spacing said retainer from the plate 226. A tension spring 240 connected between the retainer 237 and the hooked release member 210 is provided to retractibly move said hooked release member with respect to the fork 206.

A tension spring 241 is connected between the retainer 231 and the tiltable support 213 to bias said support and switch 215 thereon into an activated or closed position. A tension spring 242 is connected between a connector 243 mounted on the plate 226, and the lever 225, to bias said lever into position to position the latch 212 thereon to engage and hold the tiltable support 213 in position to open the switch 215 upon energization of the solenoid coil 217, as the circuit to the solenoid coil 217 through the switch 223 is closed by jarring the coin case, or the case for the computer pump 10.

It may be seen from the foregoing that when the switch 215 is opened due to jarring of the coin casing or the computer pump casing, the latch 212 will hold said switch in its open position as the coil for the solenoid 217 is deenergized and that the tiltable support 213 is released from the latch 212, by downward pulling movement on the release member 210 by a tine 207 of the fork 206 under control of the cam wheel 43, as the computer meter dials are reset.

Thus, when it is attempted to start the apparatus by jarring the coin case or computer pump case, the dispensing circuit will be immediately deenergized and cannot again be energized until the computer meter dials are set to zero. It should here be understood that the cam wheel 43 moves in a counterclockwise direction when setting the meter-computer dials to zero and then turns in a clockwise direction as the dials are reset. As the cam wheel 43 moves in a clockwise direction the spring 211 will move the end of the arm 202 to drop into the notch 200. During this movement the fork 206 will move the release member 210 to release the latch 212 and accommodate the spring 241 to move the tiltable support 213 in position to activate the switch 215.

In FIGURE 16, I have shown a circuit diagram including main line conductors 243 and 245, connected to a suitable source of power. The conductor 243 has the tilt switch 215 connected in series therein and is connected with the accumulator 77 through the tilt switch 215, a conductor 246 and the contacts of the mercury switch 170. The switch 170 is opened by engagement of the magnet 172 with the casing of said switch, to terminate a dispensing operation, as the stop 157 and adding ratchet wheel 76 are moved backwardly by the subtracting ratchet wheel 121 to an initial starting position.

A conductor 247 is connected from the switch 170 to the switch 185, controlling the energization of the pump motor 15. A conductor 248 is connected from the switch 185 to a solenoid coil 249 of a motor switch 250. A conductor 251 leads from the solenoid coil 249 to the contacts of the tilt switch 205. A conductor 253 is connected from the contacts of the tilt switch 205 to the conductor 245. The solenoid coil 249 is thus energized through the switches 170, 185 and 205.

Upon energization of the solenoid coil 249 the contacts 254 of the motor switch 250 will be closed, to complete an energizing circuit from the main line conductor 243 through the contacts 254 of the motor switch 280, the manually operable switch 25 and the motor 18 to the conductor 244. The pump motor 15, however, cannot be started until the nozzle 20 has been lifted from its nozzle hook 21 and the switch 25 has been closed by pulling upwardly on the switch arm 23.

A conductor 257 connects the conductor 248 with the contacts of the normally closed mercury switch 137. The switch 137 serves to energize a solenoid coil 258 for the valve 17, to effect opening of said valve. The valve 17 is opened under the control of the notch 142 on the cam wheel 141, the follower 140 on the lever arm 135 and the armature 144 of the solenoid 143 holding the follower 140 from falling into the notch 142 until the coil for the solenoid 143 is energized by closing of the switch 150.

The switch 150 is closed as the stop 157 engages the lever arm 152 and moves the control magnet 153 away from the casing of the switch. As the solenoid 154 is energized and the follower pin 140 drops into the notch 142, the switch 137 will open, to effect closing of the valve 17. The valve 17 is shown in FIGURE 15 as being a conventional form of solenoid controlled pressure operated valve having an armature 260 movable away from a pressure passageway 261 to relieve pressure from a valve piston 262 and effect opening of the valve by pressure in the pressure line 16. In order to avoid the inertial effects of the fluid movement and sudden surges of pressure in the discharge line 16, a bleeder passageway 263 is provided in a wall 265 in the valve chamber, dividing the inlet from the outlet side of the valve. Thus when the valve 17 is closed, pressure on the inlet side of said valve, and surges in the line 16 are relieved by fluid passing through the bleeder passageway 263.

As the meter-computer dials are set to zero the tilt switch 188 will be momentarily closed in the previously mentioned manner, to complete an energizing circuit to the coin motor 84 and to the coil for the solenoid 101, to effect opening of the coin gate.

A holding circuit is provided to hold the coin gate open and coin motor in operation until the switch 25 is closed. The holding circuit includes a switch 267 closed by the coil for the solenoid 101 as said solenoid is energized, and a normally closed switch 269.

When the meter-computer dials have been set to zero, the tilt switch 188 will be momentarily closed and the coin gate 96 will be moved by energization of the coil of the solenoid 101, in position to register the coin slots 65 and 66 with the slots 98 and 99 in the coin gate and accommodate coins to be deposited into the coin chutes 95a and 96a. At the same time, the coin motor 84 will be energized to drive the coin roller 83 and move the individual coins under the fingers 85 and thereby set the adding ratchet 76 in accordance with the values of the coins deposited. As the tilt switch 188 is inactivated the coin motor 84 and solenoid 101 will be held energized by the switches 267 and 269. The dispenser will then be conditioned for operation.

When the desired number of coins have been inserted in the coin slots, and the adding ratchet 76 has been set to effect the delivery of a quantity of gasoline in accordance with the coins deposited in the coins slots, the nozzle 20 may be lifted from the nozzle hook 21. The switch 25 may then be closed to complete an energizing circuit to the pump motor 15 and operate the pump. When the switch 25 is closed, a circuit is completed to the coil for the relay 270 through a conductor 275 leading from a conductor 279 energizing the pump motor 15. Closing of the switch 25 and energizing of the coil for the relay 270 will then effect opening of the switch 269. This will denergize the coin motor 84 and deenergize the coil for the solenoid 101, and accommodate the coin gate to close.

In conditioning the apparatus to deliver a quantity of gasoline selected in accordance with the coins deposited in the coin slots, the reset crank 45 is turned one complete revolution. This will reset the dials to zero, effect closing of the kick switch 188 and the tilt switch 205 and will also release the latch 212 from the tiltable support 213, in cases where the switch 215 may have been opened by jarring of the coin casing 11 or the computer pump casing. The coin motor 84 will then be energized and the coil of the solenoid 101 will also be energized to open the coin gate. As a coin or coins are deposited in the coin slots, the thrust bar 75 will set the adding ratchet 76 and move the stop 157 away from the lever arms 169 and 152. The magnet 172 will then be moved into engagement with the casing of the switch 170 and effect the closing of the contacts of said switch to energize the coil 249 for the motor switch 250 and the solenoid coil 258 of the valve 17. The system is now conditioned for the delivery of gasoline.

The nozzle 20 may then be removed from the nozzle hook 21 and placed in the inlet pipe of a gasoline tank. The valve 25 may be closed by lifting of the switch arm 23. The pump motor will then be energized to drive the pump 13. The valve 17 is then opened and stays open until the stop 157 first engages the lever arm 152, to effect energization of the coil for the solenoid 143, and accommodate the follower pin 140 to drop into the notch 142. As the cam wheel 141 is rotated in position to register the notch 142 with the follower pin 140, and the coil for the solenoid 143 is energized, the magnet 139 will open the switch 137 and effect closing of the valve 17. Upon further movement of the stop pin 157 into engagement with the lever arm 159 the magnet 172 will be moved away from the casing of the switch 170. This will open said switch and deenergize the accumulator system. The delivery of gasoline will then stop until the accumulator is again reset by operation of the reset crank and movement of the tilt switch 205 and the kick switch 188 into closed positions by the reset cam wheel 43 as previously described.

While I have herein shown and described one form in which my invention may be embodied, it may readily be understood that various variations and modifications in the invention may be attained without departing from the spirit and scope of the novel concepts thereof.

I claim as my invention:

1. In a coin controlled fluid dispensing apparatus, a pump, a motor, a valve, electrically energizable means for opening said valve, an energizing circuit for said motor and said electrically energizable means for opening said valve including a main line conductor, a normally closed switch in said conductor, electrically energizable means for opening said switch, an energizing circuit from said main line conductor to said electrical energizable means for opening said normally closed switch including a normally open switch, closing upon the jarring of said normally open switch, and energizing said electrically energizable means to effect the opening said normally closed switch and the deenergizing of the energizing circuit to said pump and motor, and latch means holding said normally closed switch open until manually reset.

2. A coin operated fluid dispensing device comprising a pump, a motor, an electrically energizable valve, a meter-computer, an energizing circuit for said pump motor and said valve including a main line conductor, a normally closed switch in said conductor, electrically energizable means for opening said switch, an energizing circuit from said main line conductor to said electrically energizable means, including a normally open switch closing upon the jarring of said switch and energizing said electrically energizable means to effect opening of said normally closed switch, latch means holding said normally closed switch open, and an operative connection from said resetting means for said meter-computer to said latch means, for releasing said latch means to effect closing of said switch upon the operation of said resetting means to reset said meter-computer.

3. A coin operated fluid dispensing device, comprising a casing, a pump in said casing, a pump motor for driving said pump, a valve in fluid communication with said pump on the downstream side thereof, a meter-computer, coin operated mechanism controlling operation of said pump and motor including an energizing circuit to said pump motor and electrically energizable means for opening said valve, including a main line conductor, a normally closed switch in said main line conductor, electrically energizable means for opening said switch, an energizing circuit from said main line conductor to said electrically energizable means including a normally open switch operable to close a circuit to said electrically energizable means upon jarring of said casing, means biasing said normally closed switch into a closed position, latch means holding said switch open upon the opening of said switch by the jarring of said normally open switch, means for resetting said meter-computer, a cam disk operated by said resetting means, and a releasing connection from said cam disk to said latch means to release said latch means and accommodate said switch to move to a closed position by the operation of resetting said meter-computer.

4. A coin operated fluid dispensing device, comprising a casing, a pump in said casing, a pump motor for driving said pump, a valve in fluid communication with said pump on the downstream side thereof, a meter computer, coin operated mechanism controlling operation of said pump and motor including an energizing circuit to said pump motor and electrically energizable means for opening said valve, including a main line conductor, a normally closed switch in said main line conductor, electrically energizable means for opening said switch, an energizing circuit from said main line conductor to said electrically energizable means including a normally open switch operable to close a circuit to said electrically energizable means upon jarring of said casing, means biasing said normally closed switch into a closed position, a lever, a latch on the free end of said lever for holding said normally closed switch open upon the opening of said switch by said electrically energizable means energized by closing said normally open switch by jarring said casing, means for resetting said meter-computer, a cam disk operated by said resetting means, and an operative connection between said cam disk and said lever operable to move said lever to release said latch upon operation of said resetting means to reset said meter-computer.

5. A coin operated fluid dispensing device comprising a pump, a pump motor for driving said pump, an electrically energizable valve having communication with said pump on the downstream side thereof, an energizing circuit for said pump motor and valve including a main line conductor, a first mercury switch, normally closed, connected in said main line conductor and controlling the energization of said motor and valve, a tiltable support for said switch, electrically energizable means for tilting said support to effect opening of said switch, a second mercury switch, normally open, connected to energize said electrically energizable means, said second switch closing upon the jarring of said switch, a latch engaging said tiltable support upon tilting thereof, by energization of said electrically energizable means to effect opening of said normally closed switch, said tiltable support being biased into position to maintain said first mercury switch closed, and manually operable means for releasing said latch to accommodate tilting of said tiltable support to close said normally closed switch and effect energization of said pump motor and valve.

6. A coin operated fluid dispensing device comprising, a pump, a motor for driving said pump, an electrically energizable valve in fluid communication with said pump on the downstream side thereof, a first mercury switch, normally closed, a tiltable support for said switch, electrically energizable means for tilting said support to effect opening of said switch, a second mercury switch, normally open, closing upon the jarring of said switch and completing an energizing circuit to said electrically energizable means for tilting said support, a spring biasing said support in position to hold said first switch open, a latch engageable with said support upon tilting of said support by said electrical energizable means, holding said support in position to maintain said switch open, a release lever for said latch, and manually operable means for releasing said release lever to accommodate the closing of said first switch by the bias of said spring.

7. A coin operated fluid dispensing device comprising, a pump, a motor for driving said pump, an electrically energizable valve in fluid communication with said pump on the downstream side thereof, a first mercury switch, normally closed, a tiltable support for said switch, electrically energizable means for tilting said support to effect opening of said switch, a second mercury switch, normally open, closing upon the jarring of said switch and completing an energizing circuit to said electrically energizable means for tilting said support, a spring biasing said support in position to hold said first switch open, a latch engageable with said support upon tilting of said support by said electrical energizable means, holding said support in position to maintain said switch open, a release lever for said latch, manually operable means for releasing said release lever to accommodate the closing of said first switch by the bias of said spring, a meter computer, resetting means for said meter-computer including a cam disk, and an operative connection between said cam disk and said release lever for releasing said latch and accommodating said spring to close said first mercury switch upon the resetting of said meter-computer.

8. A coin operated fluid dispensing device comprising, a pump, a motor for driving said pump, an electrically energizable valve in fluid communication with said pump on the downstream side thereof, a first mercury switch, normally closed, a tiltable support for said switch, electrically energizable means for tilting said support to effect opening of said switch, a second mercury switch, normally open, closing upon the jarring of said switch and completing an energizing circuit to said electrically energizable means for tilting said support, a spring biasing said support in position to hold said first switch open, a latch engageable with said support upon tilting of said support by said electrical energizable means, holding said support in position to maintain said switch open, a release lever for said latch, manually operable means for releasing said release lever to accommodate the closing of said first switch by the bias of said spring, a meter-computer, resetting means for said meter-computer including a shaft having resetting connection with said meter-computer, a cam disk on said shaft, a lever engageable with said cam disk and pivoted thereby upon resetting movement of said disk, and an operative connection between said lever and said release lever for moving said release lever to release said latch from said tiltable support, upon the resetting of said meter-computer.

9. A coin operated fluid dispensing device comprising, a pump, a motor for driving said pump, an electrically energizable valve in fluid communication with said pump on the downstream side thereof, a first mercury switch, normally closed, a tiltable support for said switch, electrically energizable means for tilting said support to effect opening of said switch, a second mercury switch, normally open, closing upon the jarring of said switch and completing an energizing circuit to said electrically energizable means for tilting said support, a spring biasing said support in position to hold said first switch open, a latch engageable with said support upon tilting of said support by said electrical energizable means, holding said support in position to maintain said switch open, a release lever for said latch, manually operable means for releasing said release lever to accommodate the closing of said first switch by the bias of said spring, a meter computer, resetting means for said meter-computer including a cam disk having a notch therein, a link pivotally connected to said lever intermediate the ends of said lever and extending therefrom, means for guiding said link for movement in the general direction of its longitudinal axis, a cam member engaging said link and effective to move said link along its axis to move said lever in a release direction upon the application of force to said link in a direction transversely of its longitudinal axis, a lever engageable with said notch upon movement of said disk in position to reset said meter-computer, and an operative connection from said lever to said link to exert force on said link transversely of the longitudinal axis of said link, upon movement of said disk into position resetting the computer dials to zero.

10. A coin operated fluid dispensing device comprising, a pump, a main line conductor, a motor energized through said main line conductor for driving said pump, an electrically energizable valve in fluid communication with said pump on the downstream side thereof and energized through said main line conductor, a first mercury switch, normally closed, a tiltable support for said switch, electrically energizable means for tilting said support to effect opening of said switch, a second mercury switch, normally open, closing upon the jarring of said switch and completing an energizing circuit to said electrically energizable means for tilting said support, a spring biasing said support in position to hold said first switch open, a latch engageable with said support upon tilting of said support by said electrical energizable means, holding said support in position to maintain said switch open, a release lever for said latch, manually operable means for releasing said release lever to accommodate the closing of said first switch by the bias of said spring, a meter-computer, resetting means for said meter-computer including a cam disk having a notch therein, a lever engageable with said notch and pivoted by pivotal movement of said disk in a resetting direction, an operative connection between said last mentioned lever and said release lever, to effect movement of said release lever in a direction to release said latch and effect closing of said first switch, upon turning of said cam disk by said resetting means, and a mercury switch connected with said main line conductor in the energizing circuit to said motor and valve and mounted on said lever engageable with said notch and opened by movement of said disk in a resetting direction and closed by said disk when said meter-computer has been reset, said mercury switch on said lever preventing the instigation of a dispensing operation until resetting of said meter-computer.

11. In a coin operated fluid dispensing device, a meter-computer, a pump supplying fluid to said meter-computer, a motor for driving said pump, a nozzle, an electrically energizable valve between said pump and nozzle, a nozzle hook, a manually operable switch adjacent said nozzle hook operable to instigate a dispensing operation, resetting means for resetting said meter-computer after a dispensing operation comprising, a resettable crank, a drive connection from said crank to said meter-computer, and an interlocking connection between said crank and said switch preventing operation of said switch during resetting of said meter-computer, said interlocking connection comprising a shaft rocked by said resetting crank upon resetting of the meter-computer, a rod connected with said switch and vertically moved by said switch, and a rocking arm on said shaft moved to intersect the line of travel of said rod and prevent closing of said switch during the operation of resetting the meter-computer.

12. In a coin operated fluid dispensing device, a meter-computer, a pump supplying fluid to said meter-computer, a motor for driving said pump, a nozzle, a valve between said pump and nozzle, electrically energizable means for opening said valve, a nozzle hook, coin controlled dispensing mechanism controlling operation of said pump and valve, a coin slot, a coin gate, electrically energizable means for opening said coin gate, a coin motor operable to move a coin to effect a setting operation of said dispensing mechanism determined by the value of the coin, a manually operable switch adjacent said nozzle hook operable to complete an energizing circuit to said motor and to prevent operation of said motor until said switch is closed, resetting means for resetting said meter-computer to zero, including a crank, a resetting shaft rotatably driven thereby, a cam on said shaft, a lever actuated by said cam, and a mercury switch on said lever completing an energizing circuit to said electrically energizable means for opening said coin gate and energizing said coin motor, and moved by said cam to an open position during resetting of said meter-computer, and to a closed position upon termination of the resetting operation.

13. In a coin operated fluid dispensing device, a meter-computer, a pump, a motor for driving said pump, a nozzle, a valve between said pump and nozzle, electrically energizable means for opening said valve, a nozzle hook, coin controlled dispensing mechanism controlling operation of said pump and valve, a coin slot, a coin gate, electrically energizable means for opening said coin gate, a coin motor operable to move a coin to effect a setting operation of said dispensing mechanism determined by the value of the coin, a manually operable switch adjacent said nozzle hook operable to complete an energizing circuit to said motor and to prevent operation of said motor until said switch is closed, resetting means for resetting said meter-computer to zero, including a crank, a resetting shaft rotatably driven thereby, a cam on said shaft, a lever actuated by said cam, a mercury switch on said lever completing an energizing circuit to said electrically energizable means for opening said coin gate and energizing said coin motor, and moved by said cam to an open position during resetting of said meter-computer and to a closed position upon termination of the resetting operation, and a second interlocking connection between said hand crank and said manually operable switch, preventing the closing of said manually operable switch during operation of said hand crank to reset the meter-computer.

14. In a coin operated fluid dispensing device, a meter-computer, a pump supplying fluid to said meter-computer, a motor for driving said pump, a nozzle, an electrically energizable valve connected between said pump and nozzle and controlling the flow of fluid from said pump to said nozzle, a solenoid for opening said valve, coin controlled dispensing mechanism controlling operation of said pump and valve, a coin casing having at least one coin slot therein, a coin gate normally closing said slot, a solenoid energizable to move said coin gate to an open position, a coin motor operable to move a coin to effect a setting operation of said dispensing device, resetting means for said computer-meter including a crank, a shaft operated thereby, interlocking means between said crank and said resetting means operable to prevent operation of said motor, opening of said coin valve, opening of said coin gate and energization of said coin motor during the operation of resetting said meter-computer, comprising two rocking arms, a mercury switch on each rocking arm, one controlling energization of said motor and valve and the other controlling energization of said coin gate solenoid and coin motor, and a cam member on said shaft having operative connection with each of said rocking arms for moving said rocking arms to open the switches mounted thereon during resetting and moving said rocking arms into position to close the switches thereon at the termination of a resetting operation.

15. In a coin operated fluid dispensing device, a meter-computer, a pump supplying fluid to said meter-computer, a motor for driving said pump, a nozzle, an electrically energizable valve connected between said pump and nozzle and controlling the flow of fluid from said pump to said nozzle, a solenoid for opening said valve, coin controlled dispensing mechanism controlling operation of said pump and valve, a coin casing having at least one coin slot therein, a coin gate normally closing said slot, a solenoid energizable to move said coin gate to an open position, a coin motor operable to move a coin to effect a setting operation of said dispensing device, resetting means for said meter-computer including a crank, a shaft operated thereby, interlocking means between said crank and said resetting means operable to prevent operation of said motor, opening of said valve, opening of said coin gate and energization of said coin motor during the operation of resetting said meter-computer, comprising two rocking arms, a mercury switch on each rocking arm, one controlling energization of said motor and valve and the other controlling energization of said coin gate solenoid and coin motor, a cam member on said shaft having operative connection with each of said rocking arms for moving said rocking arms to open the switches mounted thereon during resetting and moving said rocking arms into position to close the switches thereon at the termination of a resetting operation, a third switch controlling the supply of current to said last mentioned switches, means opening said switch upon jarring of said coin box, latch means maintaining said switch open, and a release connection between one of said rocker arms and said latch means to release said latch means to accommodate said switch to close during the operation of resetting said meter-computer and said first mentioned switches closed positions.

16. In a coin operated fluid dispensing device, a pump, a motor for driving said pump, a dispensing nozzle, an electrically energizable valve between said pump and nozzle, a meter-computer in the line between said pump and valve adapted to register the monetary value of fluid pumped, at least one coin slot, means controlling operation of said pump motor and said valve and closing said valve and stopping said pump motor upon the delivery of a preselected quantity of fluid determined by the coins deposited in said coin slot, comprising a stop movable into a preselected position in accordance with the value of coins deposited in said slot, a cam rotatably driven by said meter-computer, a ratchet actuated by said cam, and moving said stop toward a zero position, two switches, one controlling operation of said valve and the other terminating the dispensing operation, two switch arms for operating said switches, one switch arm leading the other and deenergizing said valve upon engagement of said stop with said switch arm, and the other switch arm deenergizing said motor upon engagement of said stop with said switch arm, and one of said switch arms forming a positive stop for said stop, determining the initiation and termination of a dispensing operation.

17. In a coin controlled fluid dispensing device, a pump connected with a source of fluid, a motor, a valve, a meter-computer connected between said pump and valve and adapted to register the monetary value of fluid pumped, a coin slot, means operated by the deposit of coins in said slot for determining the quantity of fluid to be pumped comprising an adding ratchet wheel, a stop rotatable with said wheel, a pawl moved by deposit of coins in said slot to move said ratchet wheel and stop in one direction from an initial zero position, a subtracting ratchet wheel coaxial with said adding ratchet wheel, an operative connection between said subtracting ratchet wheel and said adding ratchet wheel, a cam rotatably driven by said meter-computer, a subtracting pawl actuated by said cam for moving said subtracting ratchet wheel and stop toward an initial zero position, a switch controlling operation of said valve, a lever arm operable to open said switch, a cam coaxial with said first mentioned cam and having a slot therein determining opening of said switch, a follower dropping into said slot to accommodate opening of said switch, a solenoid holding said lever from opening said switch, a second switch controlling energization of said solenoid, a rocking arm closing said second switch, said rocking arm being biased to accommodate said second switch to remain open and having an arm extending into position to be engaged by said stop and moving said arm to close said switch upon preselected movement of said stop to energize said solenoid and accommodate opening of said valve as said follower drops into said notch, a third switch controlling energization of said motor, a rocking arm for opening said switch, said rocking arm extending into position to be engaged by said stop to open said switch at the termination of a dispensing operation, and one of said rocking arms serving to stop movement of said stop in a subtracting direction into an initial zero position.

18. In a coin controlled fluid dispensing device, a pump connected with a source of fluid, a motor, a valve, a meter-computer connected between said pump and valve and adapted to register the monetary value of fluid pumped, a coin slot, means operated by the deposit of coins in said slot for determining the quantity of fluid to be pumped comprising an adding ratchet wheel, a stop rotatable with said wheel, a pawl moved by deposit of coins in said slot to move said ratchet wheel and stop in one direction from an initial zero position, a subtracting ratchet wheel coaxial with said adding ratchet wheel, an operative connection between said subtracting ratchet wheel and said adding ratchet wheel, a cam rotatably driven by said meter-computer, a subtracting pawl actuated by said cam for moving said subtracting ratchet wheel and stop toward an initial zero position, a switch controlling operation of said valve, a lever arm operable to open said switch, a cam coaxial with said first mentioned cam and having a slot therein determining opening of said switch, a follower dropping into said slot to accommodate opening of said switch, a solenoid holding said lever from opening said switch, a second switch controlling energization of said solenoid, a rocking arm closing said second switch, said rocking arm being biased to accommodate said second switch to remain open and having an arm extending into position to be engaged by said stop and moving said arm to close said switch upon a preselected movement of said stop to energize said solenoid and accommodate opening of said valve as said follower drops into said notch, a third switch controlling energization of said motor, a rocking arm for opening said switch, said rocking arm extending into position to be engaged by said stop to open said switch at the termination of a dispensing operation, a fourth switch, and an operative connection between said first mentioned pawl and said fourth switch for opening said switch to deenergize said pump upon each step of operation of said pawl to set said adding ratchet to determine a quantity of fluid to be pumped.

References Cited by the Examiner
UNITED STATES PATENTS

| | | | |
|---|---|---|---|
| 1,740,878 | 12/1929 | Slezak | 194—97 |
| 2,295,493 | 9/1942 | Tratsch et al. | 194—103 |
| 2,360,241 | 10/1944 | Kuhl | 194—10 X |
| 2,539,855 | 1/1951 | Nelson | 194—97 |
| 2,754,590 | 7/1956 | Harris | 194—13 |
| 2,893,531 | 7/1959 | Hebel | 194—97 |
| 2,995,229 | 8/1961 | West | 222—2 X |
| 3,027,048 | 3/1962 | Rapisarda | 222—35 |

LOUIS J. DEMBO, *Primary Examiner.*

SAMUEL F. COLEMAN, *Examiner.*